Sept. 22, 1964 W. C. PARRISH 3,149,776
AIR COMPRESSORS UTILIZING THE KINETIC AND POTENTIAL
ENERGY OF WATER WAVES COMMON TO
BODIES OF WATER
Filed March 5, 1962

W<sup>m</sup> C. Parrish

INVENTOR

United States Patent Office 3,149,776
Patented Sept. 22, 1964

3,149,776
AIR COMPRESSORS UTILIZING THE KINETIC AND POTENTIAL ENERGY OF WATER WAVES COMMON TO BODIES OF WATER
William C. Parrish, P.O. Box 414, Colton, Calif.
Filed Mar. 5, 1962, Ser. No. 177,634
1 Claim. (Cl. 230—84)

This invention relates to the processes and apparatus for the compression of air and like fluids by means of the energy derived from the impact of water waves and the subsequent storage and the utilizations in varied manner of the air or other fluids so compressed.

The inventive thought implied in this invention takes cognizance of oceanographic publications attesting that there exists more latent power in ocean shore waves than in all the rivers of the world; if means could be found to utilize such energy.

Consideration is further given to technical treatises stating that ocean wave motion is essentially a rotary, forward motion rather than a flowing action and that waves break when the crest of the wave attains a speed equal to or greater than that of the wave body. The basis of this invention shows a device designed to cause a wave to break at a predetermined point in space and time to achieve certain results.

Essentially, therefore, this invention purports to capture the latent energy of water wave impacts through the medium of compressed air, or other fluids, after the manner, or in emulation of storing electricity in storage batteries. Compressed air comprises three prime essentials. Initially it generates heat, thence refrigeration, and basically is a power medium for doing work. Its varied applications and uses number into the hundreds, among which is included applicant's Patent No. 1,741,115, dealing with pumping by compressed air. However, an overwhelming demand, promising possibly a boon to humanity, lies in the technique of converting sea water into fresh water. In Kent's Mechanical Engineers' Handbook, Trautwine is quoted, "Sea-water freezes at 27 degrees F. The ice is fresh." One prime objective of this invention is to demonstrate that the latent energy of water waves may be made to rectify their own saline contents, through freezing or by means of multiple effect vacuum distillation, to be herein indicated.

Intrinsically shore wave currents and impacts comprise a complex subject. However, their great power may be visualized by observing the heights to which tons of water are upheaved when surged against retaining sea walls or obstructing rocks. Also the power to compress air to great pressure is attested by the air-water explosions manifest when a wave dashes against an air pocket in a rock face.

More detailed disclosures of my invention as applied to compressing air by means of the impacts of water waves is hereby made by reference being had to accompanying drawings.

Figure 1:
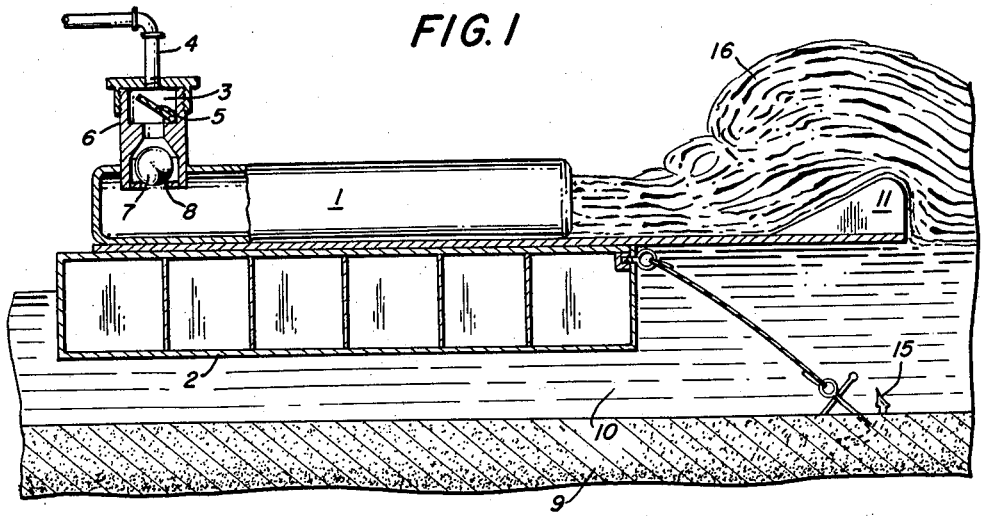
FIG. 1 shows the preferred embodiment of the invention.

FIGURE 1 is a horizontal section diagrammatic in character indicating the physical principles operative. Digit 1 points to an elongated enclosure herein designated as an air chamber. This chamber may comprise a section of pipe, though its perimeter may follow any other convenient pattern other than circular, such as square or oval, or ellipsoidal. Air chamber 1 rests upon a float comprising a raft, sealed tubes, or such devices of sufficient buoyancy to sustain its weight when water filled. Such float is shown by 2.

Chamber 1 essentially is closed at its rear end excepting for a discharge passage 3 which contains two control valves 7 and 5 and connects with outlet conduit 4. Valve seat 8 is connected to chamber 1 holding control valve 7. The opposite end of chamber 1 is left open to receive the impact of the water wave shown as 16. Extending beyond the open end of chamber 1 is a projection of float 2 which sustains an obstructing device 11 for the purpose of retarding the motion of the main body of wave 16 such as to cause the speed of the motion of the wave crest to equal or exceed that of the wave main body, thus causing the wave to break in advance of entering the air chamber 1. Obstructing device 11 is at such distance from the opening of chamber 1 as to induce maximum impact.

A sea bottom is represented at 9 with water indicated at 10. Anchor 15 is indicated as maintaining the compression unit in position with the open end of the unit facing against the wave impact, and to adjust the apparatus as a whole to the variations in tide levels. However, the same may be accomplished by piling fore and aft of a compression assembly, or the whole may be moored to a ship at sea or to a raft, a cabin boat, or a lugger, and such.

Also chamber 1 may rest upon a selected location along a sand beach, rather than upon a water float. At 6 is indicated the valve cylinder, accommodating valves 5 and 7, and communication with escape conduit 4. This conduit 4 may communicate directly with a flexible hose, such as a fire hose or the like, terminating at point of usage of the compressed air; or conduit 4 may connect with a system manifold, which in turn communicates with a flexible hose as may be needed.

As shown valve 5 is merely a check valve operating to check a return flow of compressed air into the main compression chamber. However, valve 7 is essentially a ball valve with a dual purpose. It is made buoyant to water but not to air: hence it admits freely the passage of compressed air, but checks admittance of water into the escape conduit system past valve 5.

Figure 2:
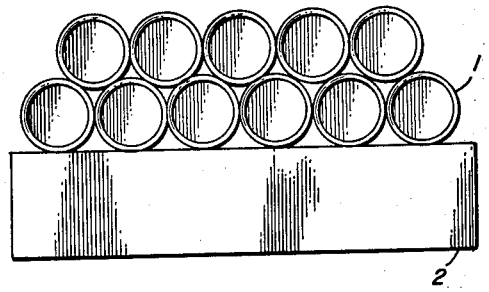
FIG. 2 shows an assembly of units upon one float in accordance with the invention.

Computations indicate that should chamber 1 be designed to contain say ten square feet of free air, the wave impacts should compress sufficient air for minor domestic uses such as kitchen refrigeration and house cooling, particularly of shore-line trailers. However, an assembly of 11 or 12 units upon one float and with common manifold connections should not require a width of more than six or seven feet and a height of more than two feet. Such an assembly is shown in FIGURE 2 of drawings.

In foregoing it is set forth that the compression chamber shown at 1 in FIGURE 1 is elongated; that is its length is considerable in relation to its cross section. Such design has in view utilizing the kinetic energy of water waves in motion creating an impact rather than merely the potential energy of same; the latter being of the nature of stored energy or weight and small in effect compared to kinetic energy. Though to a degree this device employs both types.

In FIGURE 1 at 11 is shown the adjustable wave breaking instrument that causes the wave to break and surge into the compression chamber at a time and in a manner to insure maximum kinetic energy impact. However, it has a second function. As it encounters the on-rushing wave it is depressed; thereby causing the open end of the compression chamber to become lower than the rear end thereby insuring that the water entering shall be under the imprisoned air during compression. This is a guarantee against bubble formations that would detract from the accumulated energy. Where the compression chamber serves in other locations than upon a float, the same principle is observed; that is the design imposes that the rear end shall be slightly higher than the open end as determined by the diameter of the compression chamber.

Another distinctive feature of the design of the compression chamber is that it is provided with a float valve buoyant to water but not to air; thus a water surge is prevented from following the compressed air past check valve 5 in FIGURE 1.

In practice in the application of subject invention, though the diameter of the compression chamber is restricted with reference to its length because of technical involvements, the capacities of finished compressors are not so restricted since it is the inventive purpose to use a series of such chambers in multiple. For example, chambers measuring eight inches by eight inches square are found suitable, with lengths say of ten feet. An assembly of such square chambers may be arranged in three horizontal tiers, one upon the other, resulting in a reinforced structure 2 feet high by 5 feet 4 inches wide, with a length of ten feet, comprising twenty-four chambers bound together to work as a unit and containing first 106 cubic feet of air to be followed in turn by roughly 100 cubic feet of water serving as the compression medium. As water weighs 62.4 pounds per cubic foot the total weight entering the assembled compression apparatus would be 6,240 pounds. Hence, where the complete medium is employed as a floating device, the buoyant structures as shown in FIGURE 1 at 2 would of necessity be of buoyant capacity to sustain.

Pneumatic engineers in computing the impact of kinetic energy use the formula K.E. equals ½ ×weight of moving body×square of speed per second divided by 32; same giving a quotient in foot pounds.

Albert W. Stahl of the U.S. Naval Engineers has compiled exhaustive data relative to ocean waves and he indicates a minimum of an average of seven wave impulses per minute with a minimum speed per second of ten feet; though the coast guard give speeds per second for surf boards of forty feet. Writer's personal observations indicate a wave speed of ten feet per second to be safely conservative. Using in the K.E. formula, a weight as foregoing of 6,240 pounds at an impact speed of ten feet per second and seven impacts per minute, we obtain a quotient of 68,250 foot pounds per minute; which translates into a continuous output of 2.08 H.P. of energy, a horse power being 33,000 foot pounds per minute.

An observation of the manner in which small pleasure boats at resorts like Santa Monica, California, are moored with buoys fore and aft to adjust to tides, serve to form a pattern for similarly spacing and affixing subject compressor apparatus to adjust to tide levels and to continuously face and receive water wave kinetic energy impacts. Attempts have been made before to utilize the intrinsic energy of water waves through the medium of compressing air, but such efforts have been impractical because of failure to perfect design to adjust to the distinction between mere potential energy, comprising weight or stored energy, as distinct from kinetic energy common to a body in motion carrying impact force; also such previous designs have lacked other developments perfected as essential to subject invention, such as adjustment to water levels and wave directions, or use in connection with structures such as ships afloat.

The foregoing paragraph shows that a device no wider than six feet promises conservatively the development of two horse power continuously and practically this is free; hence one hundred feet of shore line offers upwards of twenty horse power of energy in ready to use form with only the most minor costs for apparatus. An added advantageous factor is the fact that compressed air comprises first heat that may attain 485 degrees Fahr. at a gauge pressure of 100 pounds; thence refrigeration, and lastly energy easily convertible into hydraulic energy for transmission inland or elsewhere for distances of 8,000 feet at efficiencies of 95% to 98% through the use of surge pumps plus intensifiers.

Though my invention by producing compressed air in its ready to use form to furnish first heat, thence refrigeration, and power has unlimited uses, the development of fresh water from sea water has been enlarged upon because of the urgent demand for such a process. The lack of sufficient fresh water is becoming a grave problem in the southwest sections of the United States. In Baja California of Mexico the shore lines of the Gulf of California is approximately two thousand miles in length with the adjacent lands strikingly arid. In this region, particularly in Sonora, the hills and mountains are so devoid of fresh water that the native mountain sheep and deer are said to live their lifetimes without knowing the taste of water, subsisting upon the moisture in the mountain vegetation. With something of a fresh water supply that vast region, with its fertile soil, should become a paradise of attractive homes for humanity. However, in any location, no one can fail to realize the implications and great value of a new source of power that virtually is a form of water power, free for the taking.

Figure 3:
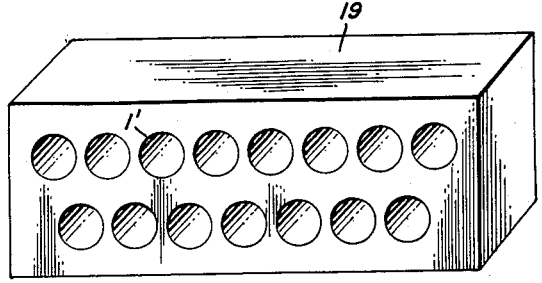
FIG. 3 shows a modification of the invention.

In the drawings FIGURE 3 indicates a variation in my invention that includes a dual purpose. Masonry constructed sea-walls and break-waters to retard the destructive actions of sea waves are prevalent everywhere. Skilled construction engineers must calculate the dimensions required to withstand the impacts of inrushing waves. The factor of rigidity of such construction imposes a great increase in the dimensions and costs of same. It calls to mind the cliché of the irresistible force encountering the immovable body. However the mechanical formula implied figures that the force of an impact is reduced in the ratio of the square of the elasticity of the resisting medium. Water and concrete are virtually without elasticity. Economies in materials demanded and increased resistance strength may be accomplished by perforating such walls and structures with a series of apertures designed to retain air as an elastic medium under the impact of waves. In the drawing of FIGURE 3, a break-water structure is indicated at 19, with 1' being a unit of a series of elongated apertures, which are open at one end facing the water wave impacts, with the opposite ends sealed, thus creating an elastic medium. Again the sealed end may include a series of delivery pipes connecting with a common manifold after the manner as set forth in the foregoing as pertaining to the series of compression chambers in FIGURES 1 and 2; thereby lending to the structures as a whole a dual purpose of functioning as breakwaters and air compression assemblies. At low tide periods the lower tiers of chambers function; at higher tides the upper tiers take over.

The inventive thought in my invention envisages shore line industrial enterprises utilizing compressed air for deepfreeze storage plants and the like; also residences warmed and refrigerated. And it is borne in mind that vast lengths of sea fronts are abutted by tidal flat lands. Hence it appears that a convenient and feasible method of transmitting inland the air power generated by the wave action is essential.

The problem of solving factors encountered in transmitting long distances the energy of elastic substances such as compressed air is met by employing inelastic or noncompressible fluids such as water. The principles thus involved are described in detail in applicant's invention 1,630,902, Pumping System, used for deep well oil pumping, but not dealing with pneumatic transmission of power. The efficiency of such hydraulic energy transmission rests upon the factor in physics wherein the friction of fluids in conduits or pipes is proportional to the fluid displacement rather than the pressure employed. Hence the low pressure compressed air may be used at point of generation to implant an excessive high pressure comparatively upon a fluid such as sea water to impell power transmission at a long distance removed. Not claimed as part of this invention, but to illustrate its practical aspects, it is set forth that if the compressed air is rendered pulsating, or intermittent in flow from its container, one pipe or conduit may be employed to transmit its energy, rather than two; or a return pipe. Applicant's air pump Patent Number 1,741,115 sets forth in detail a process for rendering air in storage under compression to flow in pulsations of power, whereby a surge pump may be utilized to deliver hydraulic power in a single conduit at distances and at high pressure. This possibility of using sea wave generated air power at distant inland points has far reaching significance.

The energy of water waves as described, in addition to lending itself readily to transmission of power to distant locations, possesses the function of being applicable to multiple effect vacuum distillation, which is the most highly efficient method developed to date of separating water from other substances. As a means of dehydration, vacuum multiple effect distillation was perfected several decades ago by the sugar refining industry and is described by the Encyclopedia Americana and more in detail by the publication, "Manufacture of Sugar" by International Textbook Company, Scranton, Pennsylvania. This process is simplified in operation in that heat exchange problems are automatic and devoid of the technical complications incidental to water purification by freezing methods. In sugar refining the problem is presented of separating seventy percent of water from thirty percent of sugar syrup. This imposes the use of heat in the form of steam. However, a series of vacuum tanks are employed, as many as seven at times; whereby the heat units in a pound of coal, the B.t.u.'s are made to distill seven gallons of water in lieu of merely one gallon—this according to the number of vacuum tanks, as described in the publications.

It is most obvious that less complications are involved in separating three and one-half percent of saline contents from sea water than in the sugar refining involvements. Moreover, air compressed from sea waves adapts admirably to vacuum distillations. Even the initial heat generated in compression is available for applications, and the phenomenon is physics that in a vacuum of .09 pressure water may be made to boil and freeze at the same time comes into play with highly beneficial results. For example, steam is not needed—merely hot water to start with to be injected into the first of the vacuum tanks used; the water in each succeeding tank being at a lower temperature until the last tank may be just above freezing. Hence steam boilers are not needed, merely primitive water heaters; and any waste fuel available, such as cuttings of mesquite from land clearings, may be used to supplement distillations.

Analyzed upon the background of accomplishments perfected in water purification by distillation in the sugar refining industries, it may be determined that a small water wave air compressor as aforementioned should supply drinking and domestic water, properly utilized, for a family unit; or that one hundred feet of sea frontage should suffice for ten family units; same being expanded for further usage in ratio to the supplemental fuel available, even reaching irrigation usages. The demand for such is world wide.

Other uses for this invention that so closely resembles a new form of water power are too numerous and inclusive in scope to detail herein more than is done in the foregoing, showing and illustrating a preferred form of apparatus and processes, but the inventive thought is not limited other than by the following claim.

What I claim is:

An apparatus for compressing air comprising an elongated tube-shaped structure forming an enclosed chamber having an open end exposed to the impacts and the accelerations of water waves acting as an air compression medium; at the opposite end of the structure an outlet cylinder provided with valve means for admitting compressed air to an outlet conduit and checking a backward flow of said air; appurtenant and supplementary to which said outlet cylinder is further provided with a spherical shaped valve buoyant to water to float into closing position preventing surges of water from following said compressed air into said outlet cylinder; a reservoir container connecting with said outlet air conduit; a floating sustaining device, a raft-like pontoon structure with marine buoyancy sufficient to keep afloat the aforesaid air compression chamber, such floating medium sustaining and supporting the said air compression unit in any optional marine location and in such adjustment as to receive maximum wave impacts; said boat-like sustaining structure further being provided with forward extending arms whereupon is mounted and adjusted a vertically protruding wave breaking device as indicated in drawings herewith, such device serving to cause waves to break and to surge into said air compression chamber with enhanced speed to produce augmented air compression with maximum efficiency.

References Cited in the file of this patent

UNITED STATES PATENTS

| | | |
|---|---|---|
| 576,920 | Toennes | Feb. 9, 1897 |
| 655,541 | Becker | Aug. 7, 1900 |
| 947,321 | Blauel | Jan. 25, 1910 |
| 960,478 | Allard | June 7, 1910 |
| 1,008,683 | Wall | Nov. 14, 1911 |
| 1,271,712 | Humphrey et al. | July 9, 1918 |
| 1,791,239 | Braselton | Feb. 3, 1931 |
| 1,860,137 | Carr | May 24, 1932 |
| 2,000,173 | Harris et al. | May 7, 1935 |
| 2,257,378 | Harris | Sept. 30, 1941 |
| 2,896,419 | Thompson | July 28, 1959 |
| 2,921,444 | Bump et al. | Jan. 19, 1960 |